INVENTOR.
PETRUS J. VAN GERWEN
BY
Frank R. Trifari
AGENT

INVENTOR.
PETRUS J. VAN GERWEN
BY
Frank R. Trifari
AGENT

United States Patent Office 3,456,199

Patented July 15, 1969

3,456,199

TWO LEVEL TO THREE LEVEL PULSE CODE CONVERTER UTILIZING MODULO-2 LOGIC AND DELAYED PULSE FEEDBACK

Petrus Josephus van Gerwen, Emmasingel, Eindhoven, Netherlands, assignor, by mesne assignments, to U.S. Philips Corporation, New York, N.Y., a corporation of Delaware Filed Mar. 8, 1966, Ser. No. 532,645
Claims priority, application Netherlands, Mar. 20, 1965, 6503570
Int. Cl. H03k 5/08
U.S. Cl. 328—36 9 Claims This invention relates to code converters for converting a series of bivalent pulses which, due to their presence and absence, characterize an information signal and coincide with a series of equidistant clock pulses, into a series of trivalent pulses spectrum components of which are suppressed in the pulse spectrum. Such code converters which suppress certain spectrum components in the pulse spectrum due to code conversion of a series of bivalent pulses composed of, for example, positive elements and zero elements into a series of trivalent pulses constituted by positive elements, zero elements and negative elements are advantageously used in practice for the transmission of signals by pulse-code modulation, for synchronous telegraphy and the like.

An object of the invention is to provide a code converter of the specified type in which, together with simplicity in structure with a linear phase characteristic, certain components of the pulse spectrum are suppressed at suitable points in the transmission band, whilst conversion of the series of trivalent pulses to the series of bivalent pulses by means of full-wave rectification may also be brought about in a surprisingly simple manner.

A code converter according to the invention is characterized in that it comprises a pulse transformation device followed by a network having a frequency characteristic similar to that of a linear combination device, to which the pulses are applied directly and also through a retarding network having a retardation time longer than one pulse period and corresponding to a multiple of the period of the clock pulses, the preceding pulse transformation device providing output pulses formed by the modulo-2-combination of the input pulses to the code converter and the output pulses from the pulse transformation device which have been retarded over a time distance equal to the retardation period of the retarding network in the network following the pulse transformation device.

In practice a code converter according to the invention is very advantageous since the suppression of spectrum components in the pulse spectrum has rendered it possible, for example, to simplify the construction of selection filters, to bring about the transmission of pilot frequencies in the transmission band without influencing by the components of the pulse spectrum, and the like.

In order that the invention may be readily carried into effect, it will now be described in detail, by way of example, with reference to the accompanying diagrammatic drawings, in which.

Figure 1:
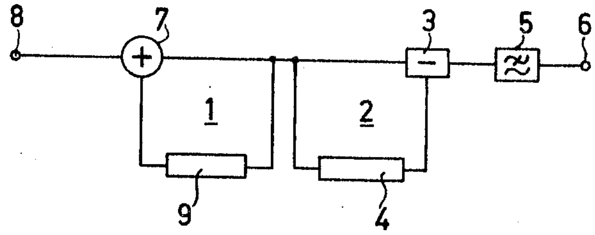
FIGURE 1 shows a code converter according to the invention.

The code converter according to the invention as shown in FIGURE 1 is intended for code conversion of a series of bivalent pulses comprising, for example, positive and zero elements, these pulses which characterize an information signal due to their presence and absence coinciding with a series of equidistant clock pulses, for example for use with synchronous telegraphy or pulse-code modulation.

The code converter of FIGURE 1 comprises the cascade combination of a pulse transformation device 1, which will be described further hereinafter, and a network 2 comprising a linear combination device in the form of a linear difference producer 3 to which the pulses are applied directly and also through a retarding network 4 having a retardation time of, for example, 2T. The period of the clock pulses is represented by $1\times T$, which is equal to one period of the signal pulses.

A shift register is advantageously used as the retardation network 4, whilst the output pulses from the difference producer 3 are applied for further transmission through a low-pass filter 5 to an output terminal 6.

Before describing further the pulse transformation device 7, the frequency characteristic of the network 2 will first be derived. To this end the network 2 has applied to it a sinusoidal oscillation of frequency $f$ and amplitude A which may be written in complex form as:

$$Ae^{j\omega t} \quad (1)$$

as is well-known, in this formula $$\omega=2\pi f \quad (2)$$

Thus the oscillation $Ae^{j\omega t}$, together with the oscillation $Ae^{j\omega(t-2T)}$ which has been delayed over a time distance 2T in the retardation network 4, appear at the output terminals of the linear difference producer 3 which oscillations provide, due to difference formation, the output signal from the difference producer 3 which has the form:

$$Ae^{j\omega t}(1-e^{-2j\omega T}) \quad (3)$$

For an input signal $Ae^{jwt}$ the network 2 provides an output signal $Ae^{j\omega t}(1-e^{-2j\omega T})$ so that the transmission characteristic may be written as:

$$\varphi(\omega)=1-e^{-2j\omega T} \quad (4)$$

or after some reduction $$\varphi(\omega)=Ce^{-j\omega T}\sin\omega T \quad (5)$$

in which C is a constant.

If a pulse signal is thus applied to the network 2 each of the spectrum components of the pulse signal experiences, according to the factor $e^{-j\omega T}$, a constant time retardation T and an amplitude variation proportional to the absolute value of $\sin\omega T=\sin 2\pi ft$, which function thus represents the frequency characteristic $\Psi(f)$ of the network 2.

Figure 2:
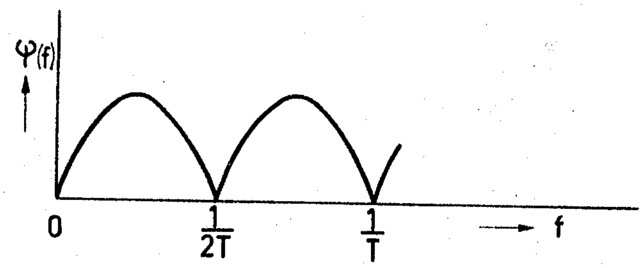
FIGURE 2 shows an associated frequency characteristic.

For illustrating purposes, FIGURE 2 shows the frequency characteristic $\Psi(f)$ of the network 2, from which it may be seen that the direct current term of the pulse spectrum is suppressed as well as the spectrum components at regular frequency distances $1/2T$. In the embodiment described, due to the suppression of the spectrum components at the frequency $1/2T$ inter alia, the construction of the low-pass filter 5 is simplified since, as is usually the case, the pulse components above the frequency $1/2T$ are suppressed by the lowpass filter 5 for the transmission through the output terminal 6.

Figure 3:
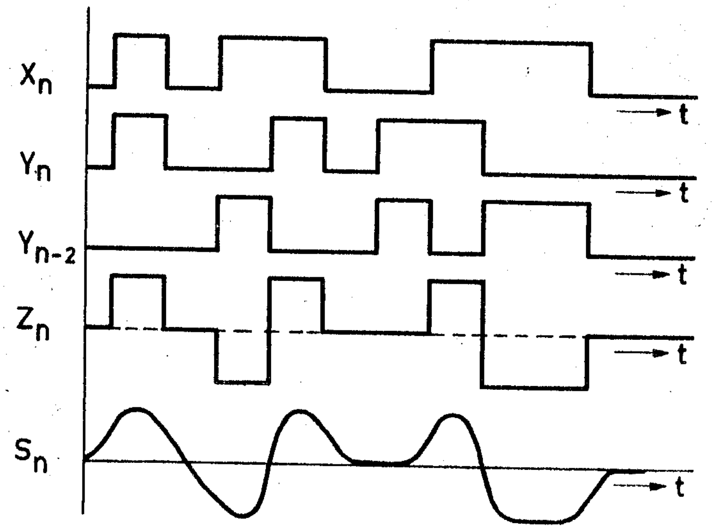
FIGURE 3 shows several time diagrams to explain the code converter of FIGURE 1.

While in the foregoing considerations we have learned about the frequency characteristic of the network 2, which frequency characteristics is especially advantageous for pulse transmission, the transmission of pulse signals by the network will now be considered more fully with reference to time diagrams shown in FIGURE 3.

If, for example, a series of bivalent pulses $Y_n$ comprising positive and zero elements is applied to the network 2, a series of pulses $Y_{n-2}$ is obtained due to retardation in the retarding network 4 over a time distance 2T, and difference formation of the two series of pulses $Y_n$ and $Y_{n-2}$ in the linear difference producer 3 results in a series of pulses $Z_n$ which is applied through the lowpass filter 5 to the output terminal 6. The series of pulses transmitted through the lowpass filter 5 is indicated by $S_n$ in FIGURE 3.

The time diagrams of FIGURE 3 show that, when a series of bivalent pulses $Y_n$ is applied to a network 2 having the frequency response curve of FIGURE 2, a series of trivalent pulses $Z_n$ is obtained comprising positive, zero and negative elements, said pulse series being especially advantageous from a viewpoint of transmission technique due to suppression of certain components in the pulse spectrum. In addition to the specified advantage of transmission technique, the described code converter affords, by arranging the pulse transformation device 1 before the network 2, the important advantage that the series of bivalent pulses applied to the code converter is restored in a surprisingly simple manner by full-wave rectification of the series of trivalent pulses $Z_n$. The series of pulses obtained by full-wave rectification of $Z_n$ is indicated by $X_n$ in the time diagram of FIGURE 3 and this series of bivalent pulses $X_n$, as has been explained hereinbefore, must form the series of pulses applied to the code converter.

To this end, in the embodiment described, the pulse transformation device 1 which precedes the network comprises a modulo-2 sum producer 7 to an input terminal 8 of which the series of pulses $X_n$ is applied, the output pulses being applied to the network 2 and also to an input terminal of the modulo-2 sum producer 7 through a retardation network 9 having a retardation time 2T equal to that of the retardation network 4. The output pulses from the modulo-2 sum producer 7 constitute the input pulses to the network 2 as already shown as the pulse series $Y_n$ in FIGURE 3, the pulse series $Y_n$ retarded over 2T in the retardation network 9 are also already shown as the pulse series $Y_{n-2}$ in FIGURE 3.

Thus modulo-2 sum formation of the two series of pulses $X_n$ and $Y_{n-2}$ in the modulo-2 sum producer 7 will have to provide the pulse series $Y_n$ and this is actually the case according to the time diagram of FIGURE 3. In fact, the modulo-2 sum producer 7 provides an outpulse if a pulse of the two pulse series $X_n$ and $Y_{n-2}$ occurs at a given instant at only one of the of the output terminals and provides no output pulse if pulses occur simultaneously at both output terminals or in the absence of a pulse. Combination of the pulse transformation device 1 and the network 2 thus forms from the bivalent pulse series $X_n$ the trivalent pulse series $Z_n$ which, together with the important property in transmission technique that certain spectrum components are suppressed in the pulse spectrum, may also be reconverted to the original pulse series $X_n$ by simple full-wave rectification.

Instead of retardation networks 4, 9 in the code converter having a retardation time 2T, it is possible to use retarding networks having other retardation times, for example 3T, . . . 4T etc., in general retardation times longer than a pulse period 1T of the signal series and corresponding to a whole multiple of the period of the clock pulses which is equal to a pulse period of the signal series or a fraction thereof. A series of trivalent pulse codes is thus obtained wherein, according to the retardation time $n$T of the retarding networks 4, 9, upon the suppression of the D.C. components, frequency components are suppressed at regular frequency distances $1/nT$ in the pulse spectrum, whilst the initial series of bivalent pulses is restored by full-wave rectification of the trivalent pulse code.

By suitable choice of the retardation time $n$T, the suppression of the frequency components may thus be fixed at a desired point in the pulse spectrum which is very advantageous for several uses, for example for simplification of the filters in a carrier telephone system, for the transmission of pilot frequencies in a two-channel pulse transmission system in which the pulses are applied via the code converter to modulators which are fed by carrier oscillations relatively shifted in phase by 90°. In fact, by suppression of the D.C. component and of the components at the frequency $1/2T$ (see FIGURE 2), at the carrier frequency and at a frequency distance $1/2T$ thereof, points within the transmission band are obtained for the undisturbed transmission of pilot oscillations which may be used at the receiving end for restoring with the correct phase, the carrier frequency required for demodulation and the clock frequency of $1/2T$.

Figure 4:
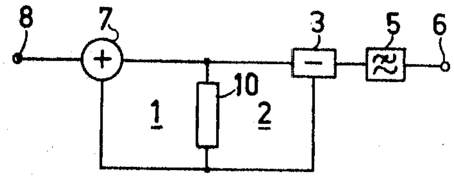
FIGURE 4 shows a considerable simplification of the code converter of FIGURE 1.

FIGURE 4 shows a considerable simplification of the code converter according to the invention as shown in FIGURE 1. In the code converter of FIGURE 1, the output pulses from the modulo-2 sum producer 7 retarded over equal time distances in a two retarding networks 4, 9 are applied to inputs of the modulo-2 sum producer 7 and of the linear difference producer 3. A single retarding network 10 suffices for applying the output pulses from the modulo-2 sum producer, retarded over equal time distances, to inputs of the modulo-2 sum producer 7 and the linear difference producer 3 by arranging the network 10, as shown in FIGURE 4, between the output of the modulo-2 sum producer 7 and the interconnected inputs of the modulo-2 sum producer 7 and the linear difference producer 3.

Figure 5:
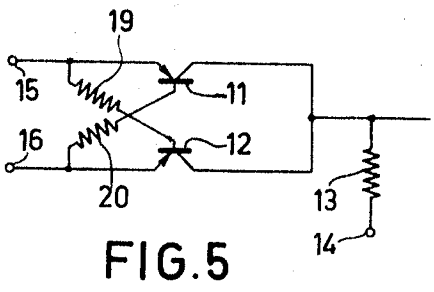
FIGURE 5 shows a detail diagram of a modulo-2 sum producer as used in the code converters of FIGURE 1 and FIGURE 4.

FIGURE 5 shows a detail diagram of a very advantageous embodiment of a modulo-2 sum producer.

In the embodiment shown, the modulo-2 sum producer comprises two transistors 11, 12 the collectors of which are connected to a terminal 14 of a supply voltage source via an output circuit 13 constituted by a common resistor, and two input terminals 15, 16 are connected to emitters of transistors 11 and 12, respectively, and through resistors 19 and 20, respectively, to the bases of the transistors 12 and 11, respectively.

If, in this arrangement, pulses occur simultaneously at both input terminals 15, 16 or in the absence of a pulse, the voltages at the emitter and the base of each of the transistors 11, 12 are equal so that there is no flow of collector current in either of the transistors 11, 12, whereas if a pulse occurs at only one of the input terminals 15, 16, one of the transistors 11, 12 will convey collector current so that the voltage across the output resistor 13 will increase. Thus the modulo-2 sum of the pulse series applied to the input terminals 15, 16 occurs at the output resistor 13.

Figure 6:
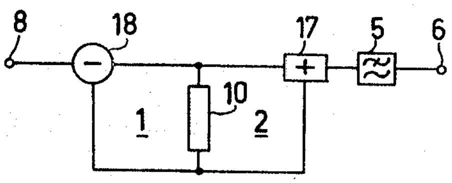
FIGURE 6 shows a variant of the code converters of FIGURE 1 and FIGURE 4.

FIGURE 6 above a variant of the code converters shown in FIGURE 1 and FIGURE 4, which variant consists in that the linear combination device used in the network 2 is a linear sum producer, whereas the modulo-2 combination device is designed as a modulo-2 difference producer 18. In this variant the modulo-2 difference producer 18 provides an output pulse if pulses appear simultaneously at both its input terminals or if no pulse is present and does not provide an output pulse if a pulse appears at only one of its input terminals. The device shown in FIGURE 5 could serve as the modulo-2 difference producer 18 by including an inverting network, for example in the form of a valve or transistor amplifier, in cascade with one of its input terminals 15, 16 or its output.

The construction of this code converter is otherwise similar to that of the code converter of FIGURE 4.

Similarly as has been explained in the foregoing, it may be shown that a retardation time $n$T of the retarding network 10 provides a frequency characteristic which is given by the absolute value of the function cos $n\omega fT$. FIGURE 6 shows the frequency characteristics for a retardation time 2T of the retarding network 10, the characteristic showing that a first suppression of the spectrum components takes place at the frequency $1/4T$ and that the other points of suppression of spectrum components lie at relatively equal frequency distances $1/2T$.

Figure 8:
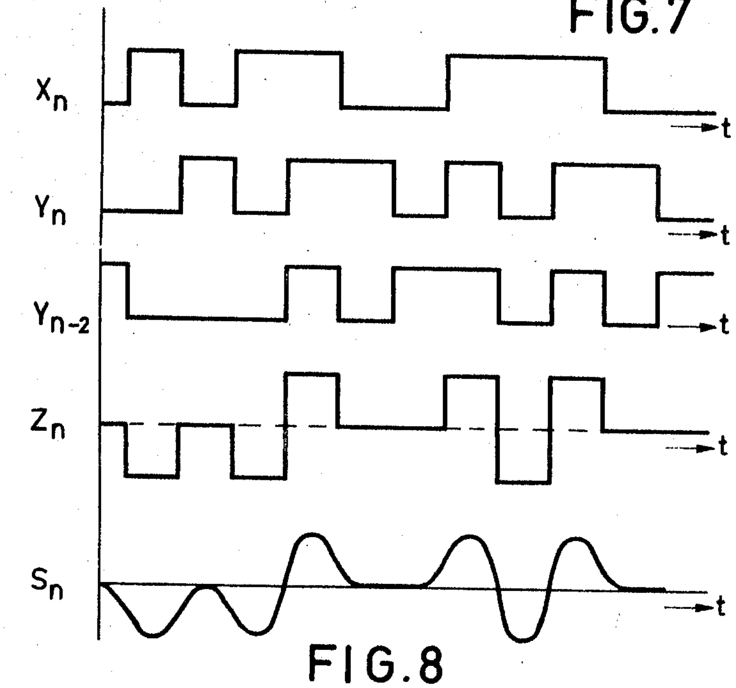
FIGURE 8 shows several time diagrams to explain the code converter of FIGURE 6.

FIGURE 8 shows the time diagrams corresponding to the code converter of FIGURE 6 if the code converter has applied to it a pulse series $X_n$ which has been made equal to the pulse series $X_n$ of FIGURE 3 for comparison purposes. Similarly as in FIGURE 3, $Y_n$ is the pulse series occurring at the output of the modulo-2 combination device 18 and $Y_{n-2}$ is the pulse series $Y_n$ which has been retarded over a time distance 2T in the retardation network 10, whilst the pulse series derived from the output of the code converter, apart from a constant D.C. term, is shown at $Z_n$ and the transmitted pulse series at $S_n$. As may be seen from these time diagrams, full-wave rectification of the series of trivalent pulses $Z_n$ again provides the original pulse series $X_n$.

Figure 7:
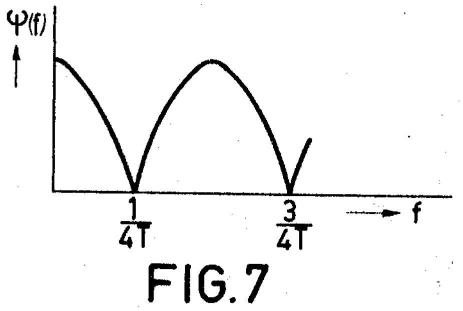
FIGURE 7 shows a frequency characteristic corresponding to FIGURE 6.

Combination of the pulse transformation device 2 and the network 1 thus provides a pulse code with frequency components suppressed in the frequency spectrum of which the points of suppression may be adjusted by suitable choice of the retardation time of the retarding network 10, whilst the initial pulse series $X_n$ is restored by full-wave rectification of the trivalent pulse code $Z_n$. A characteristic point in all these devices is that the incoming pulses are first converted into a transformed series of pulses having a waveform given by modulo-2 combination of the series of input pulses and the transformed pulse series which has been delayed in a retarding network, whereafter the series of pulses thus transformed is applied to a network having frequency characteristics of the kind shown in FIGURE 3 and FIGURE 7. It will be evident that, in addition to the embodiments described hereinbefore, arrangements in which the transformed pulse series and the succeeding network with the relevant frequency response are realized with equivalent means also fall within the scope of the invention. Thus, the desired frequency characteristic of the said network may be obtained with a network built up from resistors, capacitors and coils. The pulse transformation in the arrangement of FIGURE 1 may be obtained by the use of two cascade connected change of state modulators. In a change of state modulator, an input signal of one state effects a change of state in the output binary pattern, while an input of the other state does not affect the output pattern. (Philips Research Reports, vol. 20, No. 4, August 1965, pp. 469–484.) For example, a change of state modulator may comprise an input gate connected to provide an output clock pulse only when the input coded bivalent signal has one state with the output pulses of the gate being applied to both inputs of a conventional bistable circuit. A modulator of this type is disclosed, for example, in copending patent application 532,744, filed Mar. 8, 1966. The number of change of state modulators should correspond to the length of the delay in the linear combination circuit in terms of clock pulse periods. For example, when change of state modulators are employed in place of the transformation device 1 of FIG. 1, two cascade connected change of state modulators should be employed when the delay in network 4 is 2T, four cascade connected change of state modulators should be employed when the delay in network 4 is 4T, eight cascade connected change of state modulators should be employed when the delay in network 4 is 8T, etc. This arrangement is suitable when the ratio between the delay time in network 4 and the period of the signal pulses is equal to the value of an integral power of two.

What is claimed is:

1. A code converter for converting a series of information coded bivalent pulses which coincide with the pulses of a series of equidistant clock pulses of predetermined period, into a series of trivalent pulses having suppressed frequency spectrum components, said code converter comprising a modulo-2 logic gate having first and second input terminals and a first output terminal, means for applying said coded bivalent pulses to said first input terminal, linear combining means having third and fourth input terminals and a second output terminal, means connecting said first output terminal to said third input terminal, delay means having a delay period that is a multiple of said predetermined period for applying delayed pulses from said first output terminal to said second and fourth input terminals, and output circuit means connected to said second output terminal.

2. The code converter of claim 1 in which said modulo-2 logic gate comprises a modulo-2 sum producer, and said linear combining means comprises a linear difference producer.

3. The code converted of claim 1 in which said modulo-2 logic gate comprises a modulo-2 difference producer, and said linear combining means comprises a linear sum producer.

4. The code converter of claim 1 in which said delay means comprises a single delay network for applying said delayed pulses to said second and fourth input terminals.

5. A code converter for converting a series of information coded bivalent pulses which coincide with the pulses of a series of equidistant clock pulses of predetermined period, into a series of trivalent pulses having suppressed frequency spectrum components, said code converter comprising pulse transformation means for transforming said coded bivalent pulses into a transformed bivalent pulse series, means for delaying said transformed bivalent pulse series for a period that is a multiple of said predetermined period, and linear combination means for combining the underlayed said transformed pulse series with said delayed transformed pulse series to produce said series of trivalent pulses, said pulse transformation means comprising modulo-2 combining means for combining said coded bivalent pulses and said delayed transformer pulses.

6. A code converter for converting a series of information coded bivalent pulses which coincide with the pulses of a series of equidistant clock pulses of predetermined period, into a series of trivalent pulses having suppressed frequency spectrum components, said code converter comprising pulse transformation means for transforming said coded bivalent pulses into a transformed bivalent pulse series of pulses having first and second states and means having a transfer function $\phi(\omega)$ for converting said transformed bivalent pulse series into said series of trivalent pulses, said transfer function $\phi(\omega)$ being defined by the expression:

$$\phi(\omega)=1-e^{-jN\omega T}$$

wherein T is the period of said clock pulses, $\omega$ equals $2\pi\tau$ wherein $\tau$ is the frequency of signals applied to said means having said transfer function $\phi(\omega)$, and N is an integer greater than unity, said pulse transformation means comprising means for producing at its output a pulse of said first state whenever its input at any given instant is equal to its output, at N clock pulse periods earlier, and for producing at its output a pulse of said second state whenever its input at any given instant is unequal to its output at N clock pulse periods earlier.

7. The code converter of claim 6 in which said means having a transfer function comprises linear combining means for combining the output of said pulse transformation means with an output of said pulse transformation means delayed for N clock pulse periods.

8. The code converter of claim 6 in which said pulse transformation means comprises a modulo-2 combining means for combining said coded pulses with the output of said combining means delayed for N clock pulse periods.

9. The code converter of claim 6 in which said pulse transformation means comprises N cascade connected change of state modulators.

References Cited

UNITED STATES PATENTS 3,162,724 12/1964 Ringelhaan -------- 325—38 X

MAYNARD R. WILBUR, Primary Examiner

MICHAEL K. WOLENSKY, Assistant Examiner

U.S. Cl. X.R.

307—216, 261, 262; 325—38; 328—55, 57; 332—11; 340—347

PO-1050
(5/69)

UNITED STATES PATENT OFFICE

CERTIFICATE OF CORRECTION

Patent No. 3,456,199 Dated July 15, 1969

Inventor(s) Petrus J. Van Gerwen

It is certified that error appears in the above-identified patent and that said Letters Patent are hereby corrected as shown below:

Column 5, line 3, "6" should read -- 7 --;

Column 5, line 3, "characteristics" should read -- characteristic --;

Signed and sealed this 17th day February 1970.

(SEAL)
Attest:

Edward M. Fletcher, Jr.
Attesting Officer

WILLIAM E. SCHUYLER, JR.
Commissioner of Patents